Figure 1:
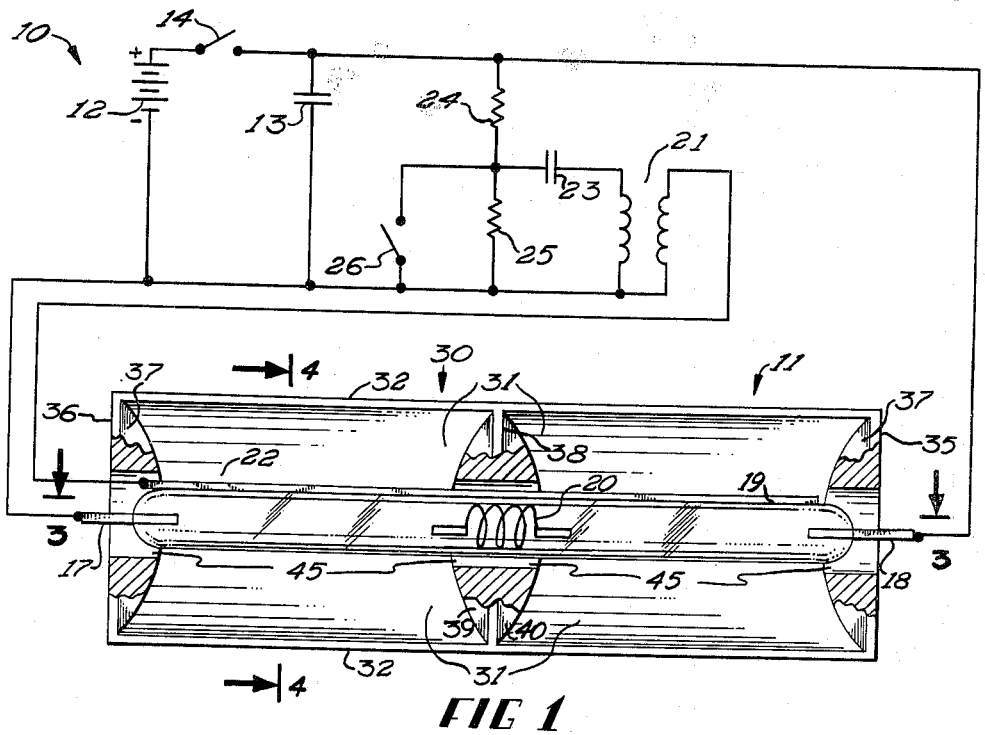

Feb. 22, 1966   J. G. TOMKINSON   3,237,003
PHOTOGRAPHIC FLASH APPARATUS
Filed Aug. 29, 1962   3 Sheets-Sheet 1

INVENTOR.
JOHN G. TOMKINSON
BY
Francis A Sir
ATTORNEY

United States Patent Office 3,237,003
Patented Feb. 22, 1966

3,237,003
PHOTOGRAPHIC FLASH APPARATUS
John G. Tomkinson, Denver, Colo., assignor to
Honeywell Inc., a corporation of Delaware
Filed Aug. 29, 1962, Ser. No. 220,214
3 Claims. (Cl. 240—1.3)

The present invention is concerned with an improved photographic flash apparatus and particularly with a photographic flash apparatus which achieves the optimum in overall efficiency by the use of a structure which matches the impedance of a gas filled photographic flashtube to the impedance of an electrical circuit which energizes this flashtube. At the same time, the optimum in efficiency of the light pattern of a combination flashtube and reflector is achieved by a structure which matches this light pattern to the viewing angle of an associated photographic camera.

As is well known, the electronic type photographic flash unit is of the general type which utilizes electrical energy which is stored in a high voltage and high capacitance value electrolytic capacitor to be discharged, in an arc type discharge, between the electrodes of a gas filled photographic flashtube, to dissipate this electrical energy in the form of light energy, as a gas discharge arc passes between the electrodes, through the gas which is contained within the glass envelope of the flashtube. The flashtube is structurally associated with the reflector in a particular manner and the reflector controls the light pattern produced by the arc discharge to illuminate a scene to be photographed by an associated camera. The normal camera has a solid viewing angle or cone which encompasses or views a solid angle of approximately 60°. Thus, for maximum over-all efficiency, it is not only necessary to insure that the impedance of the flashtube is matched to the impedance of the associated electrical circuit (to produce the maximum in electrical efficiency), but it is also desirable to construct and arrange the reflector-flashtube configuration to produce a cone of light which closely matches the viewing cone of the camera. It is only this viewing cone that the camera "sees," and thus it is only this viewing cone which it is necessary to illuminate with the associated flash unit. Illumination of other areas by the flash unit is lost insofar as the camera is concerned. If this illumination can be focused or placed within the viewing angle of the camera, the illumination efficiency of the flash unit is increased.

The present application deals with a unique construction which facilitates the matching of the impedance of the flashtube to the impedance of the electrical power supply circuit and at the same time facilitates the matching of the flashtube-reflector combination to the viewing angle of the camera.

The present invention not only relates these two efficiencies to produce a high over-all efficiency, but achieves this with a construction having a small physical size and a light weight, to thus facilitate the production of flash units which are conveniently hand-held by the photographer and do not contribute excessively to the weight of a resulting flash unit-camera combination.

It is recognized that the prior art discloses arrangements whereby a flashtube is constructed and arranged to match its impedance to an electrical circuit. Furthermore, it is generally known that particular configurations of flashtube and reflector produce light patterns covering the general viewing cone or angle of a camera. However, the present invention achieves both of these results in a single construction which is of relatively small physical size and is light in weight.

Specifically, the present invention is concerned with a photographic flashtube which consists essentially of two series connected arc lengths, the sum of whose impedance is optimally matched to the impedance of the associated electrical power supply circuit. Each of these arc lengths is associated with its own section of reflector, and the individual reflector sections, each of which produces an individual cone of light, produce an over-all cone of light closely matched to the viewing angle of a camera. The physical dimension of each of the reflector sections, in width, length and depth, can be maintained relatively small (and thus lightweight) because of the fact that each of the arc lengths is physically small and the individual reflector sections need be matched only to their individual small arc lengths within the flashtube.

Figure 3:
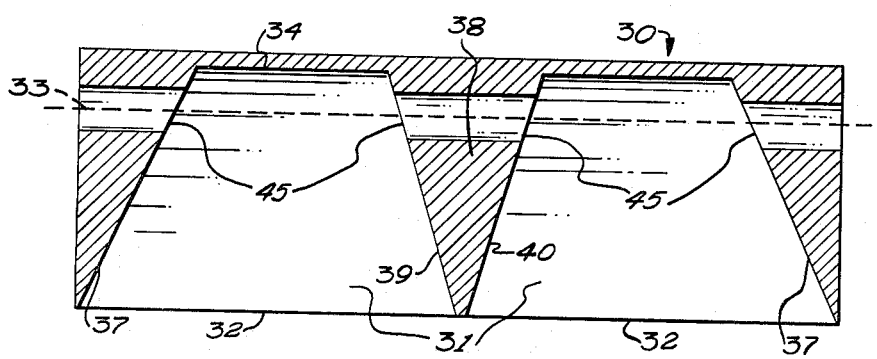
Figure 8:
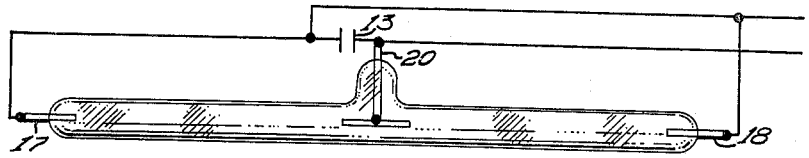
Figure 2:
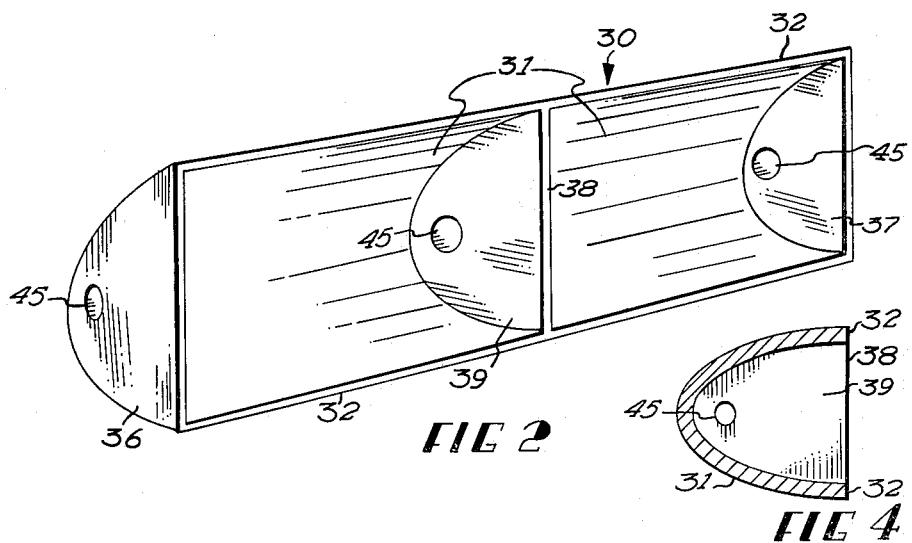
Figure 4:
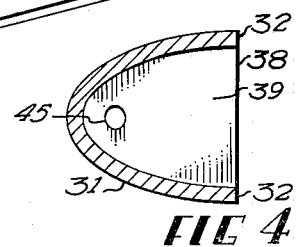
Figure 5:
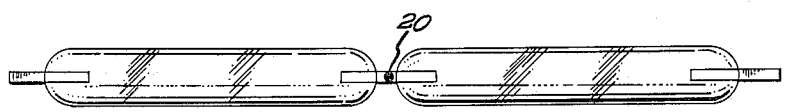
Figure 6:
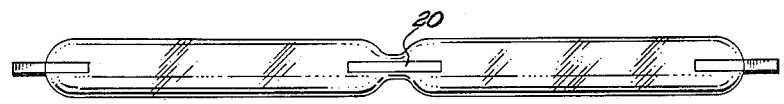
Figure 7:
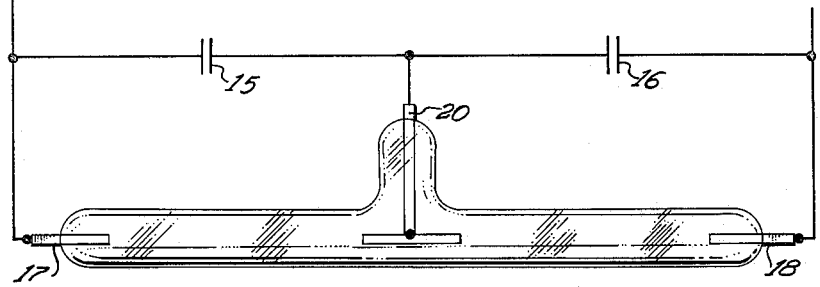
Figure 9:
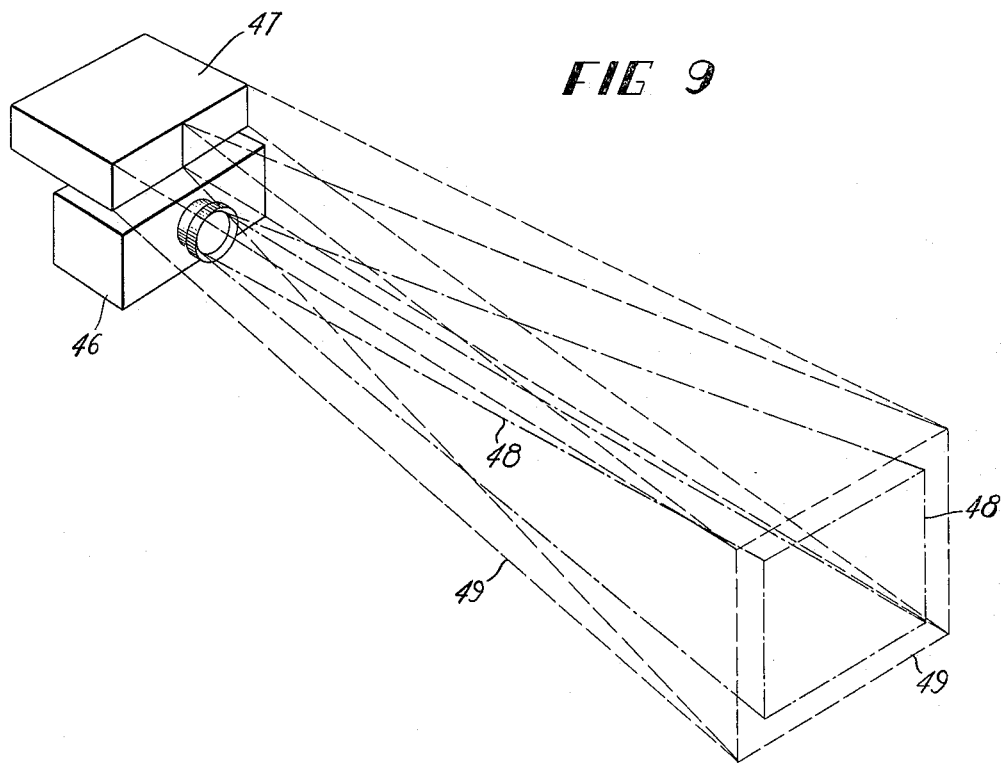

The present invention will be apparent to those skilled in the art upon reference to the following specification, claims and drawings, of which:

FIGURE 1 is a showing of a front view of a reflector and flashtube combination, with a portion thereof broken away, embodying the principles of the present invention, showing the flashtube connected to a conventional electrical circuit of the type embodied in a high voltage battery operated electronic flash apparatus, FIGURE 2 is a perspective view of the reflector of FIGURE 1, FIGURE 3 is a top section view of the reflector of FIGURE 1, FIGURE 4 is a side section view of the reflector, FIGURE 5 is a showing of a flashtube which may be utilized in place of the flashtube of FIGURE 1, FIGURE 6 is a showing of a further flashtube which may be utilized in the construction of FIGURE 1, FIGURE 7 is a showing of a further flashtube of a type which may be associated with an electrical circuit (for example, a voltage multiplier system) having a pair of series connected voltage supply capacitors, rather than the single capacitor of the electrical circuit shown in FIGURE 1, FIGURE 8 is a showing of the use of a flashtube of the type seen in FIGURE 7, wherein the two arc lengths are effectively in parallel and connected to the capacitor of the power source, and FIGURE 9 illustrates an example of the relationship between the viewing angle of a camera and the light pattern produced by apparatus according to the present invention to match said viewing angle.

Referring specifically to FIGURE 1, reference numeral 10 designates generally electrical circuit means forming the power supply of an electronic photographic flash apparatus. Reference numeral 11 designates generally the reflector-flashtube construction which forms a portion of my invention.

The electrical circuit means or power supply 10 includes a high voltage battery 12 which is connected to energize electrical energy storing means, in the form of a capacitor 13, by means of an on-off switch 14, shown in the off position.

Capacitor 13 is a high voltage capacitor having a high capacitance value, for example a 500 volt electrolytic capacitor of 200 microfarads.

Other power supply apparatus for photoflash use may utilize a voltage multiplier network to be energized from a source of alternating voltage, and apparatus of this type may utilize two series connected capacitors, for example the capacitors 15 and 16 of FIGURES 7.

The two terminals of capacitor 13 (FIGURE 1) are connected to the main current conducting electrodes 17 and 18 of an elongated flashtube having a glass envelope 19 containing an ionized gas, under pressure, and having an intermediate spaced low resistance, non-light producing current conducting path in the form of a metallic conductor 20.

The triggering of the flashtube of FIGURE 1 is achieved by means of a triggering transformer 21 whose secondary winding is connected to a triggering electrode 22 of the flashtube, and whose primary winding is connected to a triggering capacitor 23 which is in turn charged from battery 12 and capacitor 13 by means of a voltage divider 24–25. As is apparent, the closing of switch 26 (which may be the shutter switch of a camera) causes capacitor 23 to discharge through the primary winding of transformer 21 and a high voltage pulse is generated in the secondary of this transformer and applied to electrode 22 to produce ionization between the electrodes 17 and 18 of the flashtube. The gas within the flashtube goes into avalanche breakdown due to the electric field between electrodes 17 and 18 and a gas discharge immediately occurs between electrodes 17, 20 and 18, to discharge capacitor 13 and to produce a brilliant flash of light of short time duration.

In constructing electronic photographic flash apparatus, one must be concerned with electrical efficiency and light efficiency, and both of these efficiencies must be controlled to obtain the highest over-all efficiency from the flash unit. With regard to the electrical efficiency, the major contributing factor is the matching of the impedance of the flashtube to the impedance of the source which energizes the flashtube. In the case of light efficiency, the flashtube must be positioned with respect to the reflector and the flashtube-reflector combination must be such as to restrict the resulting cone of light to encompass only the area viewed by the camera.

With regard to electrical efficiency, generally speaking, high electro-optical conversion efficiency can be obtained by high gas pressure formed within the glass envelope 19. However, the high gas pressure makes the flashtube difficult and unreliable to trigger by means of the starting electrode 22. The optimum efficiency, taking into account the triggering characteristics of the flashtube, is achieved with a flashtube having, as an example, a nominal gas discharge arc length of 42 mm., an inside glass envelope diameter of 2½ mm., and a gas pressure of 600 mm. Hg.

While a flashtube having these physical dimensions produces good electrical conversion efficiency, a reflector constructed to properly mate with such a flashtube must be quite deep to control the resulting light pattern in a vertical direction (considering that the tube is positioned horizontally). However, even with such a deep reflector, poor control of the horizontal spread of the light beam results. The result is poor over-all efficiency. The present invention utilizes a two-section reflector designated generally by means of reference numeral 30, which in combination with the flashtube, corrects this lack of over-all efficiency.

Reflector 30 is essentially an elongated structure whose elongation corresponds to the elongated flashtube. The major portion of this reflector structure comprises a surface of curvature 31 (FIGURE 2) which is concave and which includes divergent extending walls terminating at the forward open face 32 of the reflector.

The surface of curvature 31 may be constructed to take a number of different shapes and is preferably of a geometric shape providing a line focal locus designated generally by means of the broken line 33 of FIGURE 3. The flashtube is positioned coincident with this focal line 33 and the vertical spread of the resultant light pattern, that is the vertical portion of the solid angle of light produced by the reflector-flashtube combination, is controlled by the depth of the reflector (the distance between the open face 32 and the apex 34 of the surface of curvature 31, FIGURE 3) and the position of the flashtube at the focal line 33.

To achieve control of the light pattern in a horizontal direction, I provide reflective light controlling walls which divide the elongated reflector 30 into a plurality of individual small side-by-side reflectors, each small reflector cooperating with an individual arc discharge of the flashtube, which arc discharges are electrically connected in series. Specifically, I provide a pair of end walls 35 and 36, one of which is mounted at each end of the elongated reflector 30. Each of these end walls includes a reflective surface 37 which is inclined to the focal line 33 and which diverges as it extends to the open face 32 of the reflector.

I further provide an intermediate barrier wall 38 which is positioned intermediate the end walls 35 and 36 and which likewise includes reflective surfaces 39 and 40 which are oppositely inclined to the focal line 33. The surfaces 37 and 40 form a pair of surfaces which diverge into the open end of the reflector whereas the surfaces 37 and 39 form a second pair of mating surfaces which diverge as they extend toward the open end of the reflector.

The end barrier walls 35 and 36 and intermediate barrier wall 38 are provided with aligned flashtube receiving openings 45 formed at the focal line 33. The flashtube is mounted, by means not shown, to extend through the openings 45 and thus through the reflector.

Thus, with the construction of my invention, a single flashtube means is provided in which two arc lengths (for example, two 21 mm. arc lengths) are electrically connected in series to obtain high over-all efficiency. By virtue of the shorter individual arc lengths, the physical dimensions of each reflector section cooperating with the arc length can be made smaller. That is, the length of each section of the reflector may be halved if each section of the arc is half the optimum total length, and the depth and width may also be halved with no change in the relative distribution and no decreases in the over-all efficiency. Also, the physical spacing and inclination of the diverging surfaces of the end walls 35 and 36 and the intermediate wall 38 are selected to produce a particular horizontal light pattern for each of the individual reflector sections, and a resulting over-all horizontal light pattern which is restricted and approximates the viewing angle of a camera.

FIGURE 9 provides an illustration of an example of what is meant herein by the matching of the cone of light or light pattern of the flash apparatus of my invention to the viewing cone or angle of the associated camera. To this end, FIGURE 9 illustrates the relationship between the viewing angle of a typical camera 46 and the light pattern produced by a flash unit 47 constructed in accordance with the present invention to include a reflector-flashtube construction of the type of the construction 11 and to produce a light pattern which matches the camera viewing angle. This angle is illustrated in FIGURE 9 by the dot-dash lines 48, while the matched light pattern of the flash unit is illustrated by the dashed lines 49. From the example illustrated in FIGURE 9, it is seen that such matching restricts the light produced by the flash unit to encompass substantially only the area viewed by the associated camera. It should be noted, however, that FIGURE 9 shows only one example of such matching for purposes of illustration, and that the light pattern produced by the apparatus of the invention, as well as the viewing angle of the associated camera, may in practice take other forms.

As can be readily appreciated, the highest electrical efficiency is obtained when the maximum of the electrical energy present at capacitor 13 appears as light energy at the arc discharge portions of the flashtube. The construction of my invention, whereby the members 17, 18 and 20 extend through the barrier wall portions, insures that the arc discharge appears only at the portion of the flashtube which cooperates with the open face sections of the reflector. Thus, very little energy is absorbed within the flashtube at that portion of the flashtube which extends through the barrier walls. The electrical current, as it leaves one section of the reflector and passes to the other section of the reflector, is conducted by means of the low resistance metallic conductor 20.

FIGURES 5 and 6 disclose alternate constructions of flashtube which may be utilized as portions of my invention. In FIGURE 5, the flashtube is seen as having two separate glass envelopes joined by the low resistance portion 20. In FIGURE 6, the low resistance portion 20 is physically held in position by a crimping of the glass envelope. The sealed gas chamber is common to the two arcs.

As has been mentioned, FIGURE 7 discloses series connected capacitors 15 and 16 which may replace the single capacitor 13 of FIGURE 1. With this type power supply, it is possible to construct and utilize a flashtube which has its portion 20 connected to the common terminal of capacitors 15 and 16 and has its main current conducting electrodes 17 and 18 connected to the opposite terminals of capacitors 15 and 16 respectively.

In FIGURE 8, a flashtube of the type seen in FIGURE 7 is connected to capacitor 13 of FIGURE 1 so that the arc lengths thereof are in parallel, rather than in series. This alternate construction may be used in the event that each arc length has too high an impedance. The placing of the arc lengths in parallel is effective to reduce this impedance.

From the above description it can be seen that I have originated a unique photographic flash apparatus having a reflector, composed of two sections in side-by-side relationship, with each section of the reflector having a depth-to-width-to-length ratio which produces a cone of light approximating the viewing angle of the camera. By placing the reflector sections side-by-side, the efficiency of a large deep reflector can be realized while maintaining a small cross section which is compatible with the short individual arcs. It has been determined that this small cross section reflector is as much as one F stop more efficient than a reflector of the same general dimensions which is not provided with the intermediate reflective barrier wall producing the side-by-side sections of the reflector. Furthermore, my construction provides control of the light in both the horizontal and vertical directions, rather than just in the vertical direction as would occur without the use of the intermediate barrier wall.

It is to be understood that the principles of my invention may be extended to the use of a plurality of series flashtube-reflector sections, such as for a very high voltage system, with the impedance of the series connection being matched to the electrical power supply and the reflector section providing control of the light pattern.

Other modifications of this invention will be apparent to those skilled in the art and it is thus intended that the scope of the present invention be limited solely by the scope of the appended claims.

I claim as my invention:
1. Electronic photographic flash apparatus having an electronic flashtube means whose electrical impedance is matched to the electrical power supply circuit means and whose physical dimension is matched to a reflector to produce a cone of light matching the viewing angle of a photographic camera, the apparatus comprising:
   electrical power supply circuit means,
   an elongated light reflector having an elongated concave surface of curvature forming a light controlling means to control the spread of the cone of light in a first direction,
   a light controlling reflective barrier member positioned within said reflector to divide said reflector into two spaced sections, said light controlling member forming a light controlling means to control the spread of the cone of light in a direction generally along a second direction which is normal to said first direction,
   said electronic flashtube means being mounted within said reflector and having first and second light producing arc lengths associated in light emitting relationship with each of said two sections of said light reflector, said flashtube means having non-light producing current conducting means mounted within said barrier member to allow electrical energy to pass between said two arc lengths in the vicinity of said barrier member,
   and circuit means connecting said flashtube means to said power supply circuit means.

2. Electronic photographic flash apparatus having an electronic flashtube with a physical construction producing an electrical impedance which is matched to the electrical power supply circuit means of the photographic flash apparatus, and whose physical dimension is matched to a reflector to produce a cone of light matching the viewing angle of the photographic camera, the apparatus comprising:
   electrical power supply means, an elongated light reflector whose major portion is formed of an open end elongated concave surface having divergent walls extending to the open end thereof,
   a pair of light barrier end walls, one of which is mounted at each end of said elongated surface to extend toward the open end thereof,
   an intermediate light barrier wall mounted along said elongated surface at a position which spaces the intermediate wall from said end walls, said intermediate wall extending toward the open end of said elongated surface,
   aligned flashtube receiving openings formed in said end walls and said intermediate wall,
   said flashtube being positioned within said reflector to extend through the openings in said end walls and said intermediate wall, said flashtube producing arc lengths associated in light emitting relationship with each of said sections of said light reflector,
   and circuit means connecting said flashtube to said power supply means.

3. Photographic flash apparatus comprising:
   electronic circuit means including a source of voltage and a pair of series connected electrical energy storage capacitors having a common terminal and having end terminals connected to the source of voltage,
   an elongated open end light reflector formed with an elongated concave surface of curvature defining an elongated axis generally parallel to the elongated surface of curvature and forming a light controlling means to control the spread of light in a first direction generally normal to said axis,
   a light controlling reflective barrier member positioned within said reflector to divide said reflector into two sections which are spaced along said axis, and forming a light controlling means to control the spread of light in a direction generally along said axis,
   electronic flashtube means mounted within said reflector and extending through said barrier member, said electronic flashtube means having a pair of oppositely disposed end electrodes and an intermediately disposed electrode member, said electrode members defining first and second light producing arc lengths associated in light emitting relationhip with said two sections of said reflector respectively,
   and circuit means connecting the oppositely disposed end electrodes of said flashtube to the end terminals of said series connected storage capacitors, and connecting the intermediate electrode of said flashtube to the common terminal of said capacitors.

References Cited by the Examiner
UNITED STATES PATENTS

| | | | |
|---|---|---|---|
| 2,323,073 | 6/1943 | Netting | 240—51.11 |
| 2,760,048 | 8/1956 | Schulte | 240—1.3 |
| 2,856,562 | 10/1958 | Grimm | 240—1.3 X |
| 2,939,984 | 6/1960 | Edgerton | 313—320 X |
| 2,953,721 | 9/1960 | Chauvineau | 315—241 |
| 2,979,640 | 4/1961 | Edmonson. | |

NORTON ANSHER, *Primary Examiner.*